Patented Apr. 21, 1931

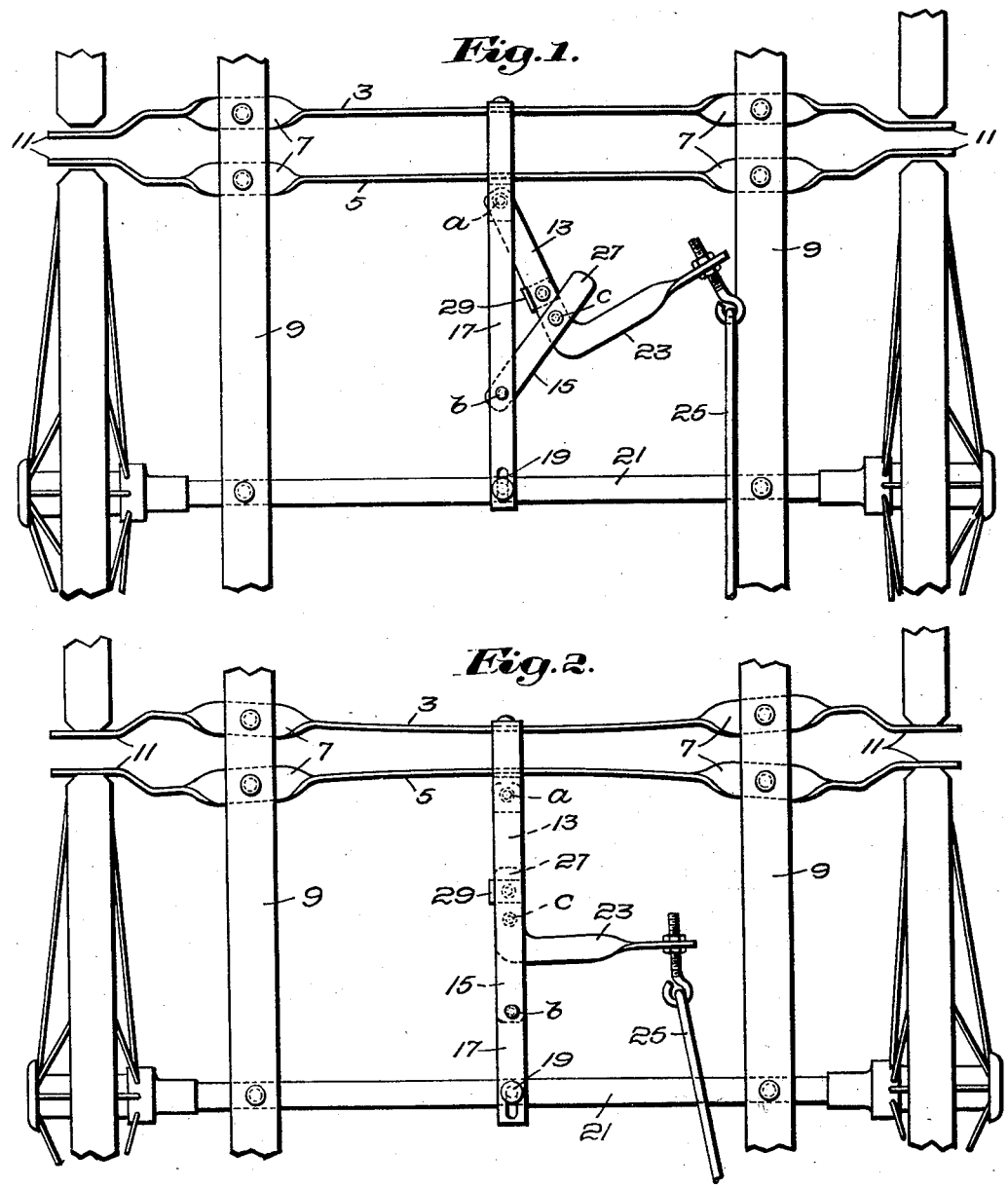

1,801,747

UNITED STATES PATENT OFFICE

EDOUARD LACHANCE, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS

BRAKE

Application filed May 25, 1929. Serial No. 365,952.

This invention relates to brakes, particularly those used on light vehicles such as baby carriages, and the object is to provide an efficient brake operating on both front and rear wheels which may be easily operated by the attendant.

My invention will be well understood by reference to the following description taken in connection with the accompanying drawings, wherein a single illustrative embodiment of the invention is shown and wherein:—

Fig. 1 is a partial plan view of the underframe and running gear of a baby carriage with brakes exemplifying my invention associated therewith and in the off position; and Fig. 2 is a similar view with the brakes on.

In the embodiment of my invention shown I utilize brakes which are resiliently pressed to the off position and thrown against spring pressure to brake the wheels. Herein I have shown brake beams 3 and 5 for the front and rear wheels respectively, preferably disposed side by side between the pairs of wheels as shown, and these brake beams herein take the form of flat spring strips disposed generally vertically but twisted adjacent their ends to provide the horizontally disposed portions 7 by which they may be pivoted to the reaches 9 of the under-frame, the ends 11 projecting as brake shoes. If the central portions of the strips are sprung, herein by pressing these portions of the two strips toward each other, the outer ends forming the brake shoes are thrown into contact with the wheels.

To permit the brakes to be applied with little effort I preferably utilize an arrangement by which one beam will be stressed first and then as the actuating movement is continued the other, and it is thus not necessary to operate against the resistance of both beams. The operating mechanism herein takes the form of a suitable linkage adapted to stress the beams in opposite directions but operating sequentially thereon. I have herein shown a toggle operating in a substantially horizontal plane and having an arm 13 pivoted at the point $a$ to the brake beam 5 and an arm 15 pivoted at $b$ to an arm 17 extending rearwardly from brake beam 3 past beam 5, this construction permitting expanding movement of the toggle to press together the central portions of the beams. In the particular embodiment shown the third pivot $c$ of the toggle is free and the toggle is thus suspended or floated on the beams without a fixed center. The arm 17 may have a pin and slot connection at 19 to some suitable fixed portion of the vehicle as, for instance, rear axle 21 to provide a stop when the beam 3 is thrown to the on position, as shown in Fig. 2.

To provide for applying preponderating force initially to beam 3 the arm 13 of the toggle may be extended substantially at right angles to form a lever 23 from which a connecting rod 25 may extend to any suitable actuating handle or pedal adapted to be moved by an attendant. The parts being in the position of Fig. 1, the connecting rod 25 is drawn rearwardly (downward in the figure) and the toggle tends to straighten, but there is also a tendency to shift it bodily rearward. The center $c$ moves rearward as the link 13 swings about point $a$ and the actuating force is expended as a thrust along link 15 to spring brake beam 3 to the position of Fig. 2. When this movement is concluded, the pin at 19 reaches the end of its slot, the bodily movement of the toggle is stopped and the continued movement of lever 23 straightens the toggle from the then fixed center $b$ and springs beam 5 forwardly (upwardly in the drawing) to the position shown in Fig. 2 and both brakes are on. The toggle is arranged to throw to or slightly past dead center, and to prevent it from breaking in the reverse direction one of the arms, as 15, may be extended at 27 and engage a suitable projecting stop 29 when the parts are in the position of Fig. 2 as shown.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In combination with resiliently yieldable brake beams adapted to be stressed in opposite directions to apply a braking force, means to stress the same comprising a linkage floated between them and means for actuating the same operating initially on one brake beam and stop means effective after stress of said one beam to permit continued action of the linkage to stress the other beam.

2. In a vehicle, in combination with a pair of resiliently yieldable brake beams adapted to be stressed in opposite directions, one beam having a limited sliding connection with a fixed portion of the vehicle, a floating toggle interposed between said beams, and means for operating the toggle effective to exert a longitudinal translatory strain bodily thereon.

3. In a four-wheeled vehicle, in combination with a pair of resiliently yieldable brake beams interposed between the pairs of wheels, the central portions of which are adapted to be stressed together to apply a braking force, a bar extending from one beam past the other and having a limited sliding connection with a fixed portion of the vehicle, a floating expanding linkage interposed between said bar and the other beam, and means for operating on said linkage effective to exert a longitudinal translatory strain bodily thereon.

In testimony whereof, I have signed my name to this specification.

EDOUARD LACHANCE.